Jan. 31, 1967　　　KYUTARO NAKAMURA　　　3,302,020
RAILWAY SWITCHING MECHANISM
Filed Feb. 11, 1964　　　　　　　　　　　　　4 Sheets-Sheet 1
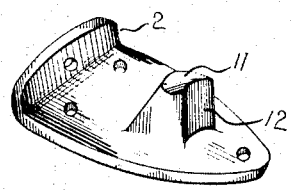
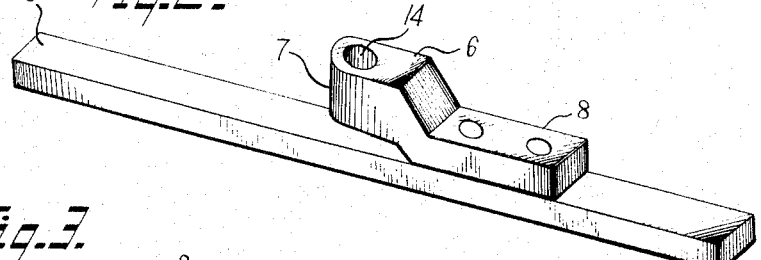
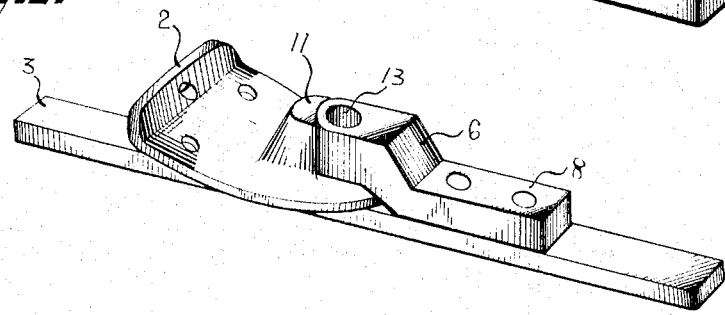
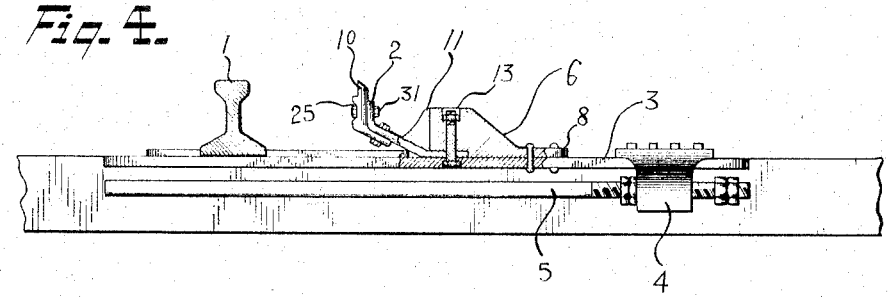
KYUTARO NAKAMURA
INVENTOR.
BY Wenderoth, Lind & Ponack
ATTORNEYS

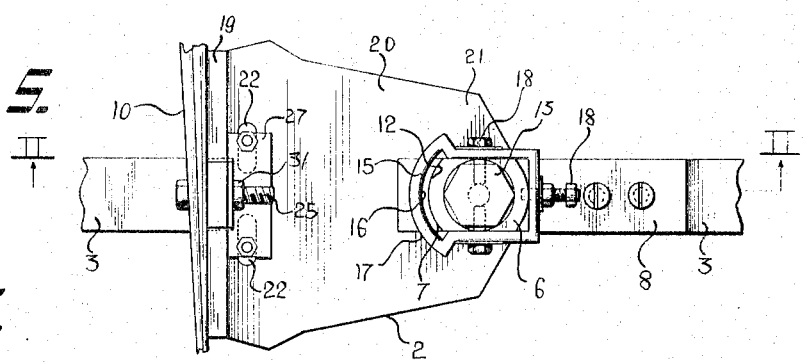
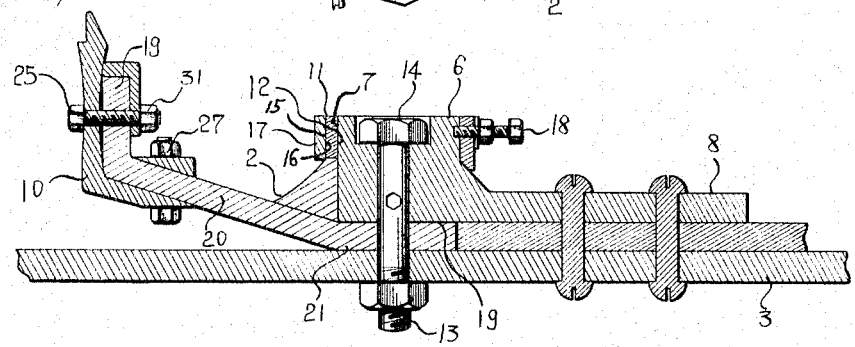
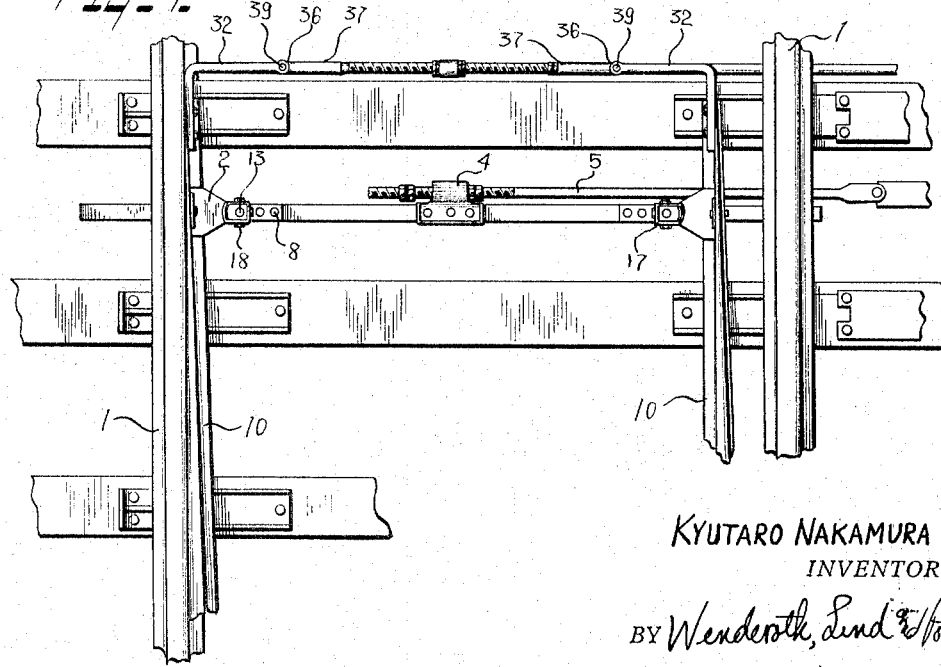

Jan. 31, 1967  KYUTARO NAKAMURA  3,302,020
RAILWAY SWITCHING MECHANISM
Filed Feb. 11, 1964  4 Sheets-Sheet 3
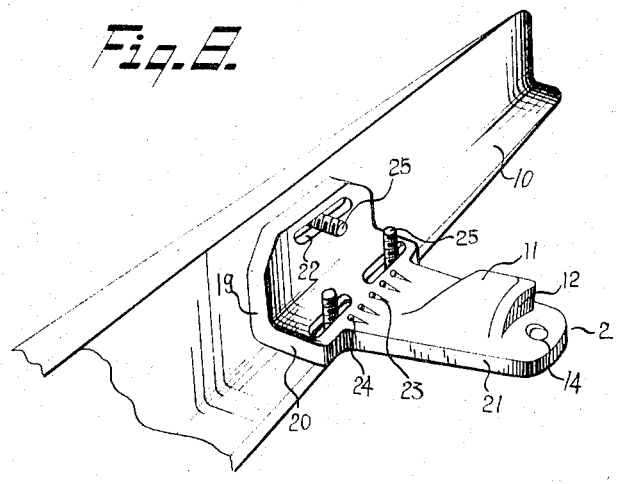
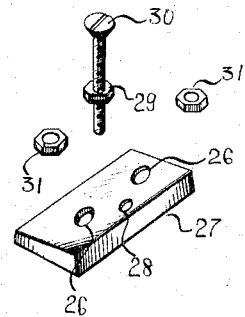
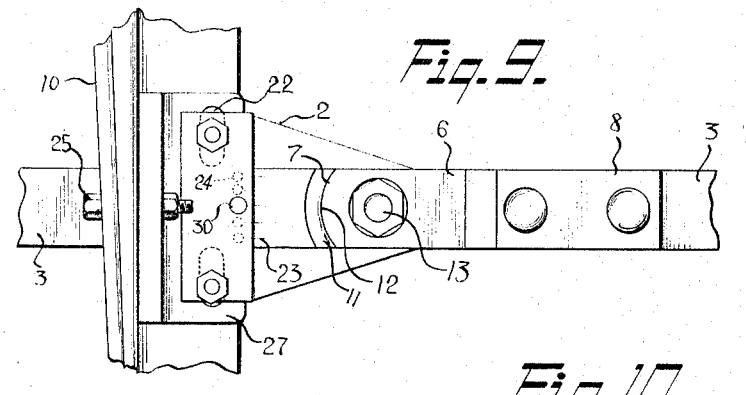
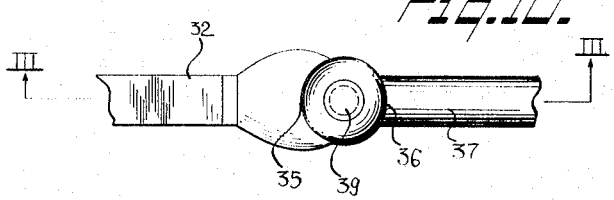
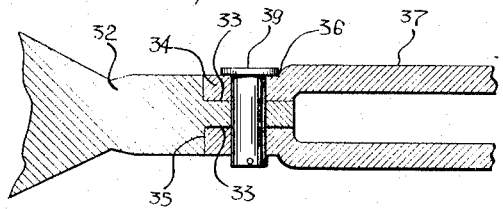
KYUTARO NAKAMURA
INVENTOR Jan. 31, 1967　　　KYUTARO NAKAMURA　　　3,302,020
RAILWAY SWITCHING MECHANISM
Filed Feb. 11, 1964　　　　　　　　　　　　4 Sheets-Sheet 4
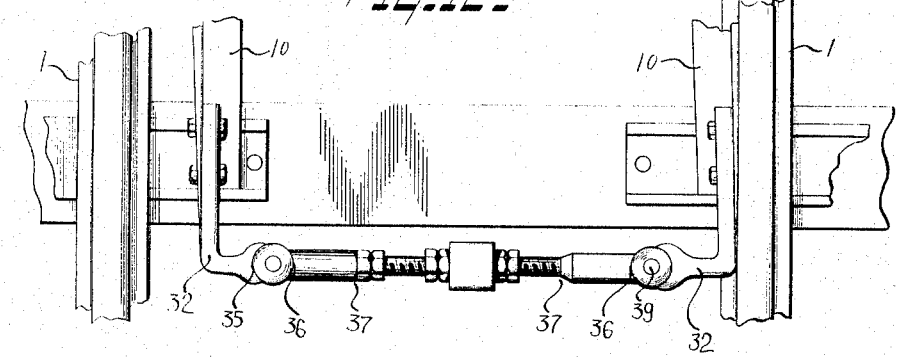
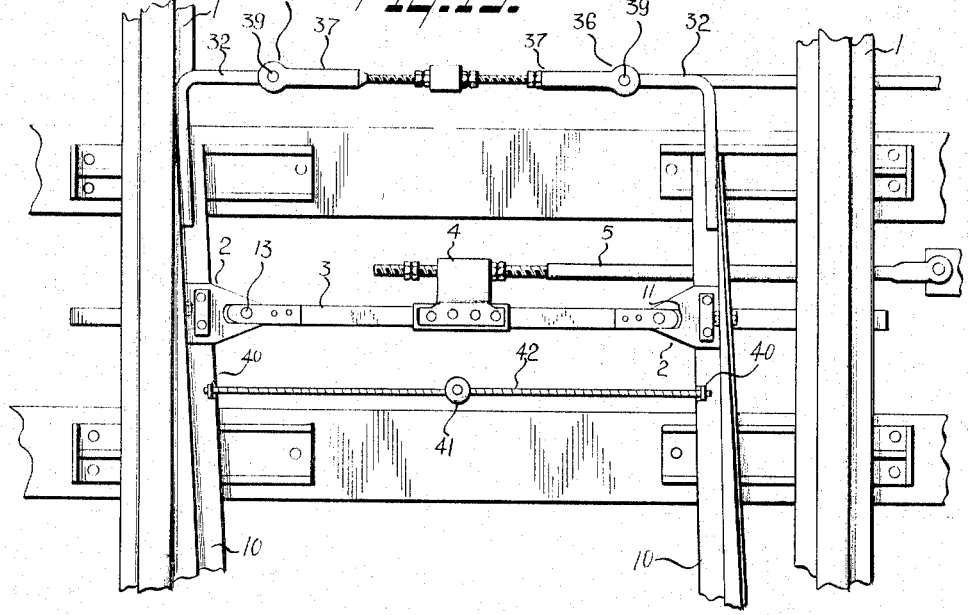
KYUTARO NAKAMURA
INVENTOR
BY Wenderoth, Lind
and Ponack
ATTORNEYS 3,302,020
RAILWAY SWITCHING MECHANISM
Kyutaro Nakamura, 3–6 Muromachi, Ikeda, Osaka, Japan
Filed Feb. 11, 1964, Ser. No. 344,047
13 Claims. (Cl. 246—452)

The present invention relates to a railway switching mechanism whereby closure rails are moved toward and away from their corresponding main rails, it being characterized in that an arcuate end of a lever for connecting together connector plates for mounting closure rails is in close contact with an arcuate recess in a projection of the said connector plate, a mounting bolt passing through the said arcuate end is loosely inserted into a hole in one end of the connector plate, a cut-away surface formed by cutting-away that surface of the said projection which is opposite to the arcuate recess is made arcuate, and a part of an actuator frame mounted on said arcuate end is in close contact with the said arcuate cut-away surface.

Since the conventional closure rail-contacting and separating mechanism comprises a contact adjusting lever for connector plates, connector levers and connector bolts, the switching force from the said adjusting lever is transmitted to the closure rails from the bolts through the connector plates, so that the said bolts are first subjected to the switching pressure or shock at the time of the passage of trains, resulting in a tendency of the said bolts to wear out. Further, owing to such wear of the bolts the pressure to be applied on the main rails is varied, thus causing disorder in the locking mechanism or damage of the locking levers. Also, it is impossible for the connector levers, connector plates and closure rails to apply a proper pressure to the main rails. Further, since an improper pressure is applied from the opposite closure rail through elbow metal attachments to the end lever and the other closure rail, damage of the elbow metal attachments such as bending and snapping will occur. Also, there will occur an instance in which the closure rails will not contact the main rails. Further, if an obstacle becomes caught between the main rail and the closure rail, this causes, as assisted by the wear of the bolts, these rails to be bent downward around the connector plates, connector levers and connector bolts and allows an erroneous completion of switching operation with the obstacle still remaining caught therebetween, resulting in the possibility of derailment. In addition, while it is necessary that the main rails and the connector lever should be maintained in perpendicular relation to each other, there will be many cases in which they are used in an abnormal condition due to the switching operation of the main rails, so that in a very complicated station yard there would occur difficulties in the adjustment of the switching operation.

An object of the present invention is to eliminate the above-mentioned disadvantages, thus preventing the failure of railway switches and hence any failures resulting from the failure of switches, and decrease the labor, time and costs required for the maintenance of switches.

Some of the important advantages of the invention will now be described in detail.

Since an arcuate end of a jaw mounted via an inclined surface and projecting from seat plate secured to the connector lever for connecting both connector plates to each other is in contact through a suitable arcuate surface with the arcuate recess in the projection of the connector plate having its root portion removably mounted on the closure rail, in a switching operation when one closure rail is to be brought into contact with or separated from the main rail, the actuation of an actuator lever causes the seat plate to urge the arcuate end of the jaw, whereby the arcuate recess in the projection in contact with the said end is concurrently moved thereby urging the closure rails mounted on the connector plates towards the main rails. Also, since the said end and the said arcuate recess are of complementary arcuate shapes, their contacting area is increased thereby providing a highly effective operative connection between them, and thus there will be no possibility that the lower end thereof will apply force directly to the mounting bolts passing through the holes in the ends of the said connector plates, even when urging the connector levers and connector plates. In this respect, the invention contributes to the prevention of the wear, breakage etc. of the said bolts.

In the above-mentioned arrangement, even if an obstacle becomes caught between the closure rail and the main rail, unlike the conventional arrangement there will be no danger of causing the downward bending or warping of the closure rails, connector plates and connector levers. Since the arcuate contact surfaces of the said end and the said projection each have an increased width in the vertical direction, the said end can perform the function of uniformly urging the said recess in the vertical direction, thereby applying a pressing force uniformly distributed in the vertical direction to the said rails, with the result that there will be no danger that the switching operation is completed while only the lower parts of the closure rails have been brought into contact with the main rails. Thus, in this respect, the invention completely prevents derailments.

Further, since the mounting bolt passing through the said arcuate end is loosely inserted into the hole in the said connector plate in such a manner that one end of the said connector plate may be allowed to be somewhat rotated with respect to the said bolt so that the connector plate may be allowed to be somewhat rotated with respect to the connector lever, the distortion or force caused by both of the connector plates and by the connector lever including both jaws during a switching operation is decreased whereby the perpendicular relation of the connector lever to the main rails can be maintained. Thus, the actuating force of the actuator lever is effectively transmitted to the closure rails through the connector lever and connector plates. In this respect, an easy and dependable switching can be carried out with a low power. A part of the actuator frame mounted on the foremost end of the connector lever is in contact with that cut-away portion of the connector plate which is opposite to the recess in the said connector plate, so that when the closure rails are to be withdrawn from the main rails by the actuator lever through the connector lever and the connector plates, a part of the actuator frame having its one end mounted on the jaw of the connector plate pushes the said cut-away surface in the withdrawal direction and thus the possibility of wear and breakage of the contact portions of the said bolts is excluded, because the actuation force of the connector lever is not imposed on the said bolts. Also in this respect, the invention excludes the possibility of causing malfunctions of the locking mechanism and other failures. Further, since the said cut-away surface is made arcuate and since a part of the actuator frame is made also arcuate whereby these arcuate surfaces are in close contact with each other to provide an increased contact surface therebetween, the force exerted by the actuator frame to act on the said cut-away surface may effectively function. In case that the said actuator frame is not employed, there may be a danger of causing wear and other damage of the mounting bolts as a considerable force is imposed on the latter upon the withdrawal of the closure rails from the main rails. Therefore, in order to meet this, there may be provided between the closure rails a tightly stretched flexible wire provided at its center with an insulator. The closure rail-attaching portions of the said wire are provided with wire-tightening members. Thus, with this arrangement, the closure rails can be easily withdrawn from the main rails with the aid of the said wire, without imposing excessive loads on the said bolts. Since the said wire is of a flexible material, the possibility of producing torsion in the wire is excluded, so that the tension applied to the wire can be effectively maintained. The said insulator prevents electric conduction between the closure rails, thereby allowing a switching operation free from trouble. The said tightening members prevent the flexible wire from slackening.

In the said connector plate, there are provided elongated openings in the closure rail-attaching portion of the upwardly bent portion and also in the inclined portion communicating with the latter, into which elongated openings are inserted bolts passing through the closure rails, said inclined portion being provided with fitting position-securing portions to which is firmly fixed one end of a washer, said bolts passing through the washer and removably connecting the connector plates to the closure rails. In the conventional arrangement, torsion was produced in connector levers upon switching operation of closure rails, thus resulting in the malfunctioning of locking mechanisms. In the present arrangement described above, during a switching operation of the closure rails, the washer is slackened thereby to move the connector plates along the said elongated openings in a direction opposite to the switching operation and again secure the connector plates to the closure rails in position, and thus it is made possible to effect a proper position adjustment of the connector plates with respect to the closure rails while urging force is maintained on the connector plates. Further, pivotally mounted on the elbow metal attachments mounted on the foremost ends of each of the closure rails is a coupling lever connected to the locking mechanism in such a manner that the coupling lever may be somewhat rotated, so that any possibility of causing torsion of coupling metal fittings during switching operation or passage of trains is excluded. The inner surface of stepped cut-away portions provided on the upper and lower portions of the elbow metal attachments is made arcuate and also the bifurcated end of the coupling lever is made arcuate. These arcuate surfaces are in close contact to provide an increased contact surface therebetween, with the result that the urging force of the coupling lever exerted at the time of a switching operation can be effectively transmitted to the elbow metal attachment, without any portion of the said force being applied to a pin for pivotally mounting the elbow metal attachment and the coupling lever. Thus, the possibility of causing wear and breakage of the said pin is excluded, and there will be no malfunctioning of the locking mechanism.

The invention will now be described with reference to preferred embodiments of the invention shown in the accompanying drawings, in which:

FIG. 1 is a perspective view of a connector plate for mounting closure rails;

FIG. 2 is perspective view of a connector lever for connecting both connector plates together;

FIG. 3 is a perspective view showing how to mount the said connector plates and connector lever;

FIG. 4 is a front view, partially cross-section, of a closure rail-contacting and separating means;

FIG. 5 is a plan view of the closure rail-contacting and separating means provided with an actuator frame;

FIG. 6 is a sectional view taken along the line VI—VI of FIG. 5;

FIG. 7 is a plan view of a switch including the said contacting and separating means shown in FIG. 5;

FIG. 8 is a perspective view showing how to remove the connector plate for mounting the closure rail having a fitting position ensuring portion, washer, lock bolt, etc.;

FIG. 9 is a plan view showing the mounting of the those parts which are shown in FIG. 8;

FIG. 10 is a plan view showing the mounting of elbow metal attachments and a coupling lever;

FIG. 11 is a cross-sectional view taken along the line XI—XI of FIG. 10;

FIG. 12 is a plan view showing the mounting of the coupling lever and elbow metal attachments tightened between the closure rails; and FIG. 13 is a plan view of the switch having a flexible wire attached thereto.

Referring to FIGS. 1–4, a connector lever 3 for connecting connector plates 2 and 6 together is provided just below main rail 1 and secured to a required number of crossties so that the connector lever is perpendicular to the said main rails, the ends of the said connector lever 3 extending beyond the main rails. The connector lever 3 is provided at its center with an actuator lever-fixing member 4 secured thereto at its root portion. A threaded portion of an actuator lever 5 passing through the said member 4 is threadedly engaged with nuts, thereby connecting the connector lever 3 and the actuator lever 5. A jaw 6 is provided at its foremost end with an arcuate end 7. A seat plate 8 connected to the said jaw 6 is secured to the said connector lever 3. There is provided a clearance 9 between the lower surface of the jaw 6 and the connector lever 3. The said connector plate 2 is secured to a closure rail 10 which is movable toward and away from the main rail 1. A recess 12 provided on the inner surface of a projection 11 on the said plate 2 is formed with an arcuate surface suitably engageable with the arcuate end 7. A root portion of the said plate 2 is inserted into the said clearance 9. A mounting bolt 13 passing through the jaw 6 is loosely fitted in a hole 14 of the said plate 2. Thus, the end 7 and the recess 12 are closely contacted with each other, while a slight relative turning movement is allowed between them.

Since the end 7 and the recess 12 are in close contact at their arcuate surfaces, the actuating force from the actuator lever 5 is transmitted through the actuator lever 3 to the end 7 of the jaw 6, thereby causing the latter to urge the recess 12. Thus, the actuating force is not applied to the contact portion of the mounting bolt 13, whereby the wear of the contact portion of the mounting bolt 13 is prevented and hence there will be no danger of causing the malfunction of the locking mechanism of the switch and other failures, thus preventing railway accidents. Further, the recess 12 of the projection 11 and the foremost end of the jaw 6 of the connector lever 3 are in contact with each other at their arcuate surfaces, and the connector is loosely pivotally mounted in the clearance 9 under the lower surface of the jaw 6 by means of the mounting bolt 13, with the result that, upon switching, the structure can endure the deflection produced in the connector lever 3 including both connector plates 2 and both jaws 6. Thus, the connector lever 3 is always maintained in perpendicular relation to the main rails 1, and the force exerted by the actuator lever 5 is effectively transmitted through the connector lever 3 and the connector plates 2 to the closure rails 10.

In a conventional switch, the connection between connector plates 2 and the connector lever 3 is such that the force from the actuator lever is transmitted through the connector lever and the connector plate to the lower parts of the closure rails. Thus, if an obstacle is caught between the upper portions of the closure rails and the main rails the connector lever is caused to be bowed downward around the connector bolts connecting the connector plates and the connector lever to each other, with the result that the closure rails and the main rails are brought into contact with each other at their lower portions only, because the upper portions thereof are prevented from contacting each other by the obstacle which is still caught therein. As a result, the actuating operation of the actuator lever is completed "by rote" with the obstacle caught therein and the locking mechanism is set. This is often the case with the conventional switches, and can cause derailment. On the contrary, according to the invention, as mentioned above, the foremost end 7 of the jaw and the recess 12 are in contact with each other thereby to provide an increased contact area therebetween, and thus the actuating force from the actuator lever 5 is uniformly transmitted through the foremost end of the jaw 6 and the recess of the projection in close contact therewith to the closure rails. As a result, there will be no danger of causing a malfunction of the locking mechanism which would cause railway accidents.

Referring to FIGS. 5 through 7, in the projection 11 of the connector plate 2 secured to the closure rail 10, there is provided a cut-away surface 15 concentric with the said recess 12 by cutting away a surface on the opposite side of projection 2 from the recess 12.

An actuator frame 17 provided at its inner surface with an arcuate surface 16 having a shape complementary to that of the said arcuate cut-away surface 15 is fitted in the jaw 6 and is secured thereto by clamp bolts 18. In this case the arcuate surface 16 is so provided as to be in close contact with the cut-away surface 15.

When the closure rail is to be withdrawn from the main rail by the actuator lever 5 through the connector lever 3 and the connector plate 2, the above-mentioned contact of the cut-away surface with a part of the actuator frame 17 mounted on the foremost end 7 of the connector lever 3 causes a part of the actuator frame mounted on one end of the jaw 9 of the connector plate 9 to push the cut-away surface in said withdrawal direction. Thus, the possibility of imposing the actuating force of the connector lever 3 on the said mounting bolts 13 is excluded. Also in this respect, the invention eliminates malfunction of the locking mechanism or railway accidents.

Further, since the arcuate cut-away surface 15 of the projection 11 is concentrically positioned and in contact with the arcuate surface 16 of the actuator frame 17 and since the arcuate foremost end 7 of the jaw 6 is also concentrically positioned and in contact with the arcuate recess of the projection 11, their respective contact areas are increased and the actuating force at the time of switching operation can be effectively transmitted with the aid of each arcuate surface. There will be no loss in transmission power occurring at any arcuate surface.

Referring to FIGS. 8 and 9, the above-mentioned connector plate 2 is in the shape of a sector and consists of an upwardly bent portion 19, an inclined portion 20 connected thereto, and a horizontal root portion connected thereto. The bent portion 19 and the inclined portion 20 are provided with a number of elongated openings such as at 22, the said inclined portion being also provided with a number of fitting position securing holes 24. Into the connector plate 2 are inserted bolts 25 passing through the closure rails. A washer 27 having small holes 26 spaced corresponding to the distance between bolts 25 as projected above the inclined portion 21, and having its upper surface flat and its lower surface shaped to correspond to the inclined part of the connector plate is provided with a small threaded hole 28, in which hole 28 is threadedly engaged a lock bolt 30 having a lock nut 29 thereon. The washer 27 is engaged with the bolts 25 where they project above the inclined portion 21, and then the lock bolt 30 for the washer 27 is positioned so as to bear against one of the fitting position securing holes 24 and thus lock the washer in place, and thereafter each bolt is threadedly engaged with their respective clamping nuts 31, thereby securing the connector plates 2 to the associated closure rails 10.

Since the connector plate 2 is shiftably connected through the elongated openings 22 to the closure rail 10, the adjustment of a switching lever can be simply effected by slacking the clamping nuts 31 so as to set the connector plate 2 in position through the elongated openings 22. More particularly, the lock nut 29 threadedly engaged with the lock bolt 30 is slackened to free the lock bolt 30, and at the same time the clamping nuts 31 of the bolts 25 passing through the closure rail are slackened to allow hammering along the elongated openings 22 in the direction opposite the switching movement of the closure rails thereby securing a proper position. Then, at a proper position the lock bolt 30 for the washer 27 is set so as to bear against one of the fitting position securing holes 24 which is required for this adjustment. Then, each lock nut 31 is clamped through the washer 27. Thus, it can be seen that this method of adjusting and fixing makes it possible to effect an easy, quick and dependable adjustment of positions even if the pressures of the connector plates 2 have been imposed on the closure rails.

Further, the configuration of the lower surface of the washer 27 which is complementary to that of the inclined part enables the maintaining of the washer 27 with its upper part always horizontal, thereby facilitating the insertion of the clamping bolts.

Referring to FIGS. 10 through 12, the above-mentioned closure rails 10 are each provided at its end with an elbow attachment 32. The elbow attachment 32 is provided at its upper and lower portions with stepped cut-away portions 33 having their inner surfaces 34 arcuately formed. There is provided a coupling lever 37 provided with a bifurcated end portion 36 having arcuate surfaces 35 conforming to the inner surfaces of the said cut-away portions 33. The bifurcated end portion is loosely engaged with the cut-away portions 33. A pivot pin 39 passing through the bifurcated end portion is loosely inserted in a hole in the elbow attachment 32. Thus, the elbow attachment 32 and the coupling lever 37 are in close contact with each other on their arcuate surfaces, the said coupling lever being so mounted that it is rotatable to some extent with respect to the elbow attachment 32.

Since the coupling lever 37 is mounted so that it is rotatable to some extent with respect to the elbow attachments 32, the deflection which will be produced in the coupling metal attachments at the time of a switching operation can be endured. Since the stepped cut-away portions 33 provided in the upper and lower portion of the elbow attachment 32 have their inner surfaces arcuately formed and the bifurcated end in close contact therewith has a complementary arcuate surface, the contact area between both surfaces is increased, so that the urging pressure of the coupling lever 37 at the time of switching is not imposed on the pivot pin 39 of the elbow attachment 32 and the coupling lever 37, but is effectively transmitted to the elbow attachment 32 uniformly over the entire surface thereof, thereby excluding the possibility of causing wear and damage of the said pin. Further, the shock which will occur at the time of the passage of trains or switching operation and which would otherwise be received by the pin through the coupling lever 37 will, in this case, be received by the arcuate recess provided in the inner surface 34 of the cut-away surface of the elbow metal attachment 32, whereby the shock directed toward the pin 39 is relieved.

In the embodiment shown in FIG. 13 there is provided no actuator frame 17, and the closure rails 10 will be provided with wire tightening devices 40, to each of which is fixed a flexible wire 42 having an insulator 41 provided at its centre.

Conventionally, as in the case where there was no actuator frame such as indicated at 17 provided, high loads were imposed on the mounting bolts 13 at the time of the withdrawal of the closure rails from main rails so that there was a danger of causing wear of the said bolts 13. On the contrary, according to the invention wherein the flexible wire 42 is provided between the closure rails through the wire tightening devices 40, the closure rails can be easily withdrawn from the main rails with the aid of the said wire 42 without imposing any force on the bolts 13. Further, since the said wire 42 is a flexible wire, the deflection which will be produced in the said wire can be endured and thus the actuating force can be effectively transmitted. The above-mentioned insulator 41 prevents electrical conduction between the closure rails 10, thus allowing a switching operation without hindrance. The above-mentioned wire tightening devices 40 prevent the slackening of the flexible wire 42.

While the preferred forms of the invention have been shown and described herein, it is to be understood that the same is not so limited but shall cover any and all modifications of the invention which fall within the purview thereof.

What I claim is:

1. A device for bringing closure rails in a railway switch into and out of contact, characterized in that the arcuate ends of a connector lever for connecting together connector plates for closure rails are in close slidable contact with arcuate recesses provided in the projections of the said connector plates, and bolts passing through the said arcuate ends are each loosely inserted into a hole in one end of each of the said connector plates.

2. A device according to claim 1, characterized in that an arcuate surface is provided on the surface of the said projection which is opposite to the said recess, and a part of an actuator frame mounted on the said arcuate end is complementary to and in slidable contact with the said cut-away surface.

3. A device according to claim 2, characterized in that the closure rail attaching portion on the said connector plate and the inclined portion connected thereto are both provided with a number of elongated openings into each of which is inserted a bolt and a washer superposed on said inclined portion, and the said inclined portion is provided with fitting position securing means, and a further bolt passing through said washer having its one end secured to the said securing means, thereby removably mounting the connector plates on the closure rails.

4. A device according to claim 3, characterized in that on an elbow metal attachment on the end of each closure rail is mounted a coupling lever connected to a locking mechanism so that it may be somewhat rotatable relative to the said elbow metal attachment.

5. A device according to claim 1, characterized in that a tight flexible wire is provided between both closure rails.

6. A device according to claim 5, characterized in that said wire is provided at its center with an insulator and at its closure rail attaching portions with wire tightening members.

7. A device according to claim 1, characterized in that a closure rail attaching portion on the said connector plate and an inclined portion connected thereto are both provided with a number of elongated openings into each of which is inserted a bolt passing through the associated closure rail and a washer superposed on said inclined portion, and the said inclined portion is provided with fitting position securing means, and a further bolt passing through said washer having its one end secured to the said fitting position securing means, thereby removably mounting the connector plates on the closure rails.

8. A device according to claim 7, characterized in that the closure rail attaching portion is an upwardly bent member on the connector plate and said two elongated openings extend in the direction of the closure rail, and said fitting position securing means comprise a number of recesses adjacent the elongated openings, and said further bolt is a lock bolt passing through the washer and can be inserted into any of the said recesses, and thereafter the other bolts passing through the closure rail have nuts threaded thereon against the washer, thereby securing the connector plate to the closure rail through the said washer.

9. A device according to claim 7, characterized in that said washer has a bottom surface which is shaped to conform to the said inclined portion and a top surface which is horizontal.

10. A device according to claim 1, characterized in that on an elbow metal attachment on the end of each closure rail is mounted a coupling lever connected to a locking mechanism so that it may be somewhat rotatable relative to the said elbow metal attachment.

11. A device according to claim 10, characterized in that the coupling lever connected to a locking mechanism has the end thereof bifurcated, the end of each portion of said bifurcated lever being arcuate, the foremost end of an elbow metal attachment indirectly connected to the said locking mechanism and secured to a closure rail being cut away at its upper and lower surfaces, the inner surface of both of the said cut-away surface being arcuate, and the arcuate ends of the portions of the coupling lever and the arcuate inner surfaces of the elbow metal attachment being complementary and being in sliding contact with each other, and a pivot pin connecting said lever and elbow metal attachment at the center of curvature of said arcuate surfaces.

12. A device according to claim 1, characterized in that the connector lever for connecting together closure rails has a jaw thereon, said jaw having the arcuate surface which is closely contacted with the arcuate recess provided in the connector plate for mounting the closure rails.

13. A device according to claim 1, characterized in that in fitting position securing portion of each connector plate for connection to a closure rail there are provided a plurality of recesses disposed in the direction of the closure length of the rail, said recesses serving as the means for determining the closure rail mounting positions for the said connector plate, a washer superposed on said connector plate, an end of a lock bolt passing through said washer and engageable with any of the said recesses, and an identification mark or stripe is provided on said closure plate at each of the said recesses and extends in a direction normal to the closure rail.

References Cited by the Examiner

UNITED STATES PATENTS 625,961    5/1899    Strom _____ 246—451

FOREIGN PATENTS 175,697    3/1917    Canada.
196,526    3/1938    Switzerland.

ARTHUR L. LA POINT, *Primary Examiner.*

S. B. GREEN, *Assistant Examiner.*